US008001264B2

(12) United States Patent
Lee

(10) Patent No.: US 8,001,264 B2
(45) Date of Patent: Aug. 16, 2011

(54) METHOD FOR SUSPENDING AND RESUMING CONTENT TRANSMISSION/RECEPTION

(75) Inventor: Ji-Hye Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 101 days.

(21) Appl. No.: 12/499,044

(22) Filed: Jul. 7, 2009

(65) Prior Publication Data

US 2009/0270081 A1 Oct. 29, 2009

Related U.S. Application Data

(62) Division of application No. 12/142,578, filed on Jun. 19, 2008.

(30) Foreign Application Priority Data

| Jan. 21, 2008 | (KR) | 10-2008-0006360 |
| Apr. 3, 2008 | (KR) | 10-2008-0031356 |

(51) Int. Cl.
*G06F 15/16* (2006.01)
(52) U.S. Cl. ...................... 709/232; 709/231
(58) Field of Classification Search ........ 709/231, 709/232
See application file for complete search history.

(56) References Cited

U.S. PATENT DOCUMENTS

| 5,566,225 | A | * | 10/1996 | Haas | 455/423 |
| 5,991,287 | A | * | 11/1999 | Diepstraten et al. | 370/338 |
| 6,546,425 | B1 | * | 4/2003 | Hanson et al. | 709/227 |
| 6,876,639 | B1 | * | 4/2005 | Cao | 370/331 |
| 7,644,139 | B2 | * | 1/2010 | Shenfield | 709/219 |
| 7,701,905 | B2 | * | 4/2010 | Farley et al. | 370/331 |
| 2005/0144478 | A1 | * | 6/2005 | Yamanaka et al. | 713/201 |
| 2007/0043836 | A1 | * | 2/2007 | Kim | 709/219 |
| 2007/0260637 | A1 | * | 11/2007 | Shenfield et al. | 707/104.1 |
| 2008/0101295 | A1 | * | 5/2008 | Tomita et al. | 370/331 |
| 2008/0275839 | A1 | * | 11/2008 | Zabawskyj et al. | 707/1 |
| 2009/0059865 | A1 | * | 3/2009 | Zhang et al. | 370/331 |

(Continued)

FOREIGN PATENT DOCUMENTS

JP 2004-336090 A 11/2004

(Continued)

OTHER PUBLICATIONS

Open Mobile Alliance Ltd. "Dynamic Content Delivery Technical Specification—Session and Transactions", Draft Version 1.0, OMA-TS_DCD_Semantics-V1_0-20071220-D, Dec. 20, 2007, 147 pages.*

(Continued)

*Primary Examiner* — George C Neurauter, Jr.
(74) *Attorney, Agent, or Firm* — Birch, Stewart, Kolasch & Birch, LLP

(57) ABSTRACT

According to an embodiment, a method for suspending content transmission/reception, includes: transmitting, if content reception within a certain channel needs to be suspended, an error notification message to a server, wherein the error notification message includes a first element indicating that the content reception is suspended, and a second element indicating a name, an attribute, or a value of a message found to be an error; transmitting a channel suspend request message to the server, wherein the channel suspend request message includes a third element for specifying an ID for the certain channel; and receiving a channel suspend response message from the server, wherein the channel suspend response message includes a fourth element containing IDs and status values for the channels requested for the transmission suspension.

5 Claims, 3 Drawing Sheets

U.S. PATENT DOCUMENTS

2009/0083144 A1* 3/2009 Menditto et al. ............... 705/14
2010/0074182 A1* 3/2010 Shao ........................... 370/328
2010/0291953 A1* 11/2010 Ahopelto et al. ............ 455/466

FOREIGN PATENT DOCUMENTS

| | | |
|---|---|---|
| JP | 2005-6340 A | 1/2005 |
| JP | 2005-268834 A | 9/2005 |
| JP | 2006-140891 A | 6/2006 |
| JP | 2006-301877 A | 11/2006 |
| KR | 1020060127266 A | 12/2006 |
| KR | 10-2007-105562 A | 10/2007 |

OTHER PUBLICATIONS

"Section 13 Error Handling Update", Doc# CCM08-037C1, Jan. 19, 2008 Open Mobile Alliance Ltd., pp. 1-11.

"Channel Suspension in Section 6.1.6", Doc# CCMO8-037C1, Jan. 21, 2008 Open Mobile Alliance Ltd., pp. 1-2.

"Resume to Repair Request", Doc# CCM08-037C1, Jan. 21, 2008 Open Mobile Alliance Ltd., pp. 1-2.

"Channel Suspension in Section 6.1.6", Doc# CCM08-037C1, Feb. 25, 2008 Open Mobile Alliance Ltd., pp. 1-4.

* cited by examiner

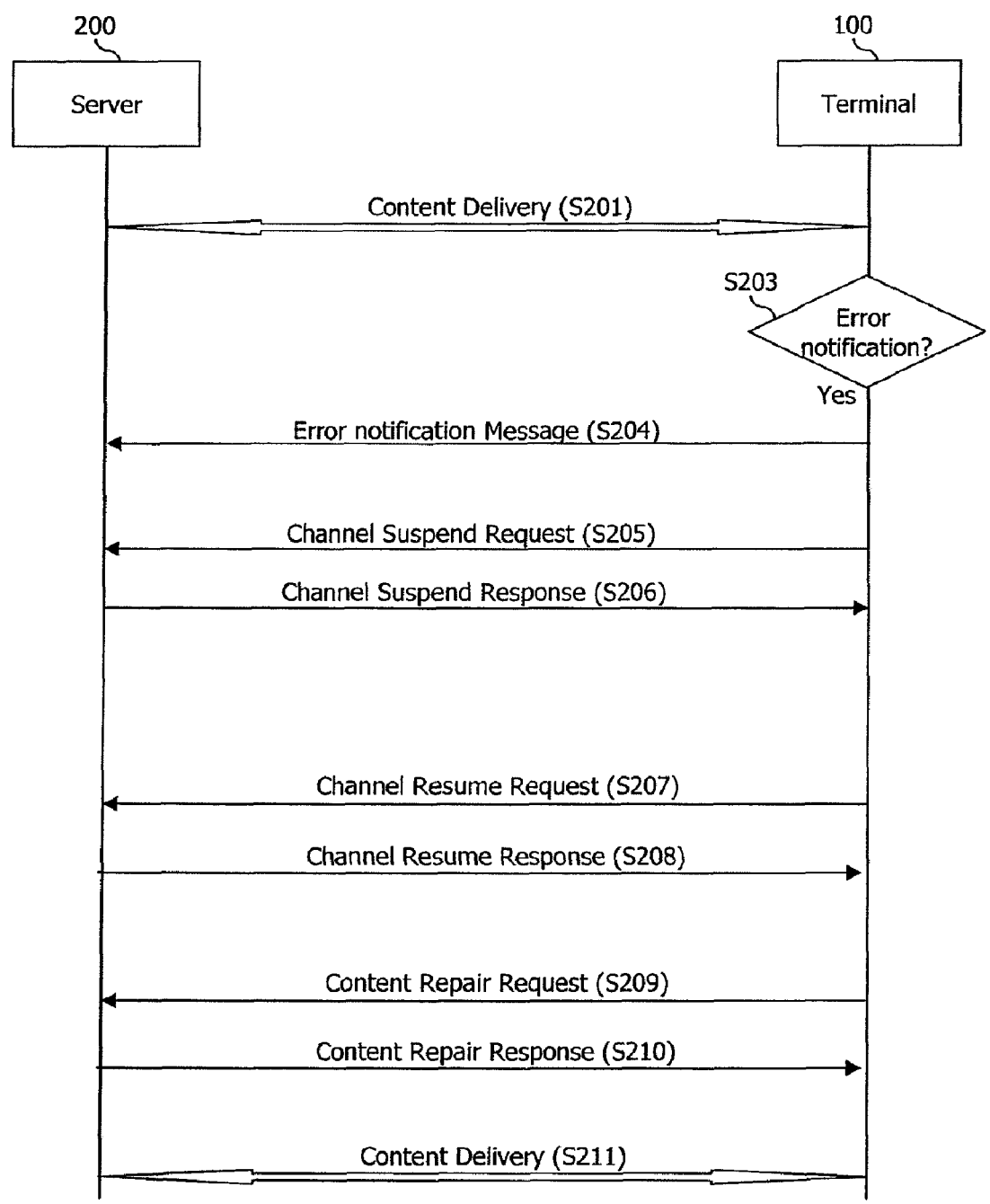

METHOD FOR SUSPENDING AND RESUMING CONTENT TRANSMISSION/RECEPTION

This Application is a Divisional of co-pending application Ser. No. 12/142,578, filed on Jun. 19, 2008, which claims priority under 35 U.S.C. §119 on Korean Application Nos. 10-2008-0006360 and 10-2008-0031356, each filed on Jan. 21, 2008 and Apr. 3, 2008, respectively. The entire contents of each of these are hereby incorporated by reference in their entirety.

BACKGROUND

1. Field of the Invention

The present invention relates to content transmission/reception, and in particular, to suspending and resuming content transmission/reception.

2. Description of the Background Art

In a related art, while data e.g., a content is delivered to a terminal, the delivery of the content is interrupted for some reasons, for instance, a priority of a reception of the content by the terminal becomes low due to an incoming voice call and thusly the content delivery is interrupted, a server which is transmitting the content may not know about this interruption. Under such a situation, the server continues to unnecessarily maintain the content delivery, thus to waste network resources.

In addition, even though a user of the terminal wants to suspend the content delivery, since there is no proper procedure for the server to suspend the data delivery, the terminal cannot notify such to the server. Accordingly, the server does not know for what reason the content delivery has been suspended, and the server unnecessary attempts to re-transmit the content.

Besides, since there is no proper procedure, the terminal generally discards all contents, including even a portion which had been successfully downloaded. Accordingly, even though the terminal desires to re-download the content some time later, it inevitably downloads the entire of the content again, thereby wasting the network resources and increasing a cost.

Further, from the perspective of an internal construction of the terminal, the terminal includes a reception part and an upper application part. Here, the reception part of the terminal has successfully received the content from the server and informed the server about this. In a state that the content is not yet delivered to the application part, if the content delivery is interrupted for an unexpected reason, the application discards all of the contents since the content is incomplete. However, the server acknowledges that the terminal has successfully received all of the contents. Accordingly, some time later, even though the terminal requests a retransmission of only a part which failed to receive, the server cannot manage appropriately.

SUMMARY OF THE INVENTION

Therefore, it is an object of the present invention to provide a procedure which can suspend or resume content transmission/reception.

It is another object of the present invention to provide a procedure, at the time of resuming content transmission/reception, which can resume the content transmission/reception from a part which it has not been completed.

To achieve these and other advantages and in accordance with the purpose of the present invention, as embodied and broadly described herein, there is provided a method for suspending content transmission/reception, including: transmitting, if content reception within a certain channel needs to be suspended, an error notification message to a server, wherein the error notification message includes a first element indicating that the content reception is suspended, and a second element indicating a name, an attribute, or a value of a message found to be an error; transmitting a channel suspend request message to the server, wherein the channel suspend request message includes a third element for specifying an ID for the certain channel; and receiving a channel suspend response message from the server, wherein the channel suspend response message includes a fourth element containing IDs and status values for the channels requested for the transmission suspension.

Preferably, the error notification message may be an ErrorNotification message, the channel suspend request message may be a ChannelSuspendRequest message, and the channel suspend response message may be a ChannelSuspendResponse message.

The first element of the error notification message may be an "error-code" element having a 'delivery interrupted' value, and the second element of the error notification message may be an "errored-parameter" element having a value of transmitted bytes of the content. The third element of the channel suspend request message may be a "channel-ID" element. The fourth element of the channel suspend response message may be a "status" element.

To achieve these and other advantages and in accordance with the purpose of the present invention, as embodied and broadly described herein, there is provided a method for resuming content transmission/reception, including transmitting a channel resume request message to a server in order to resume a certain channel which content reception has been suspended, wherein the channel resume request message includes a first element for specifying an ID for the certain channel; receiving a channel resume response message from the server, wherein the channel resume response message includes a second element having an ID and a status value for the certain channel; transmitting a content repair request message in order to resume the suspended reception for a certain content within the certain channel, wherein the content repair request message includes a third element for specifying an ID for the suspended content and a fourth element for specifying bytes successfully received; and receiving the suspended content from the server.

Preferably, the channel resume request message may be a ChannelResumeRequest message, and the channel resume response message may be a ChannelResumeResponse message. And, the content repair request message may be a ContentRepairRequest message. Preferably, the first element of the channel resume request message may be a "channel-ID" element. Further, the second element of the channel resume response message may be a "status" element. Also, the third element of the content repair request message may be a "failed-content ID" element, and the fourth element of the content repair request message may be a "byte-received" element.

Preferably, the method further includes the step of receiving a content repair response message from the server, and the content repair response message may include a content-package element for indicating a requested content package for repair.

The foregoing and other objects, features, aspects and advantages of the present invention will become more apparent from the following detailed description of the present invention when taken in conjunction with the accompanying drawings.

Effect of the Invention

The present invention provides a procedure which is capable of suspending or resuming content transmission/reception, thereby preventing an unnecessary waste of network resources and reducing a cost.

Also, the present invention may resume, at the time of resuming content transmission/reception, the content transmission/reception from a part where the content transmission/reception has not been completed, thereby preventing an unnecessary waste of network resources and reducing a cost.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a flowchart showing a method according to a second embodiment of the present invention.

DETAILED DESCRIPTION OF THE PREFERRED EMBODIMENTS

Description will now be given in detail of the embodiments of the present invention, examples of which are illustrated in the accompanying drawings.

Hereinafter, a part which is unrelated to main features of the embodiments of the present invention will not be described in detail, but will be cited what is described in OMA-TS-DCD_Semantics-V1_0-20080307.

Figure 1:
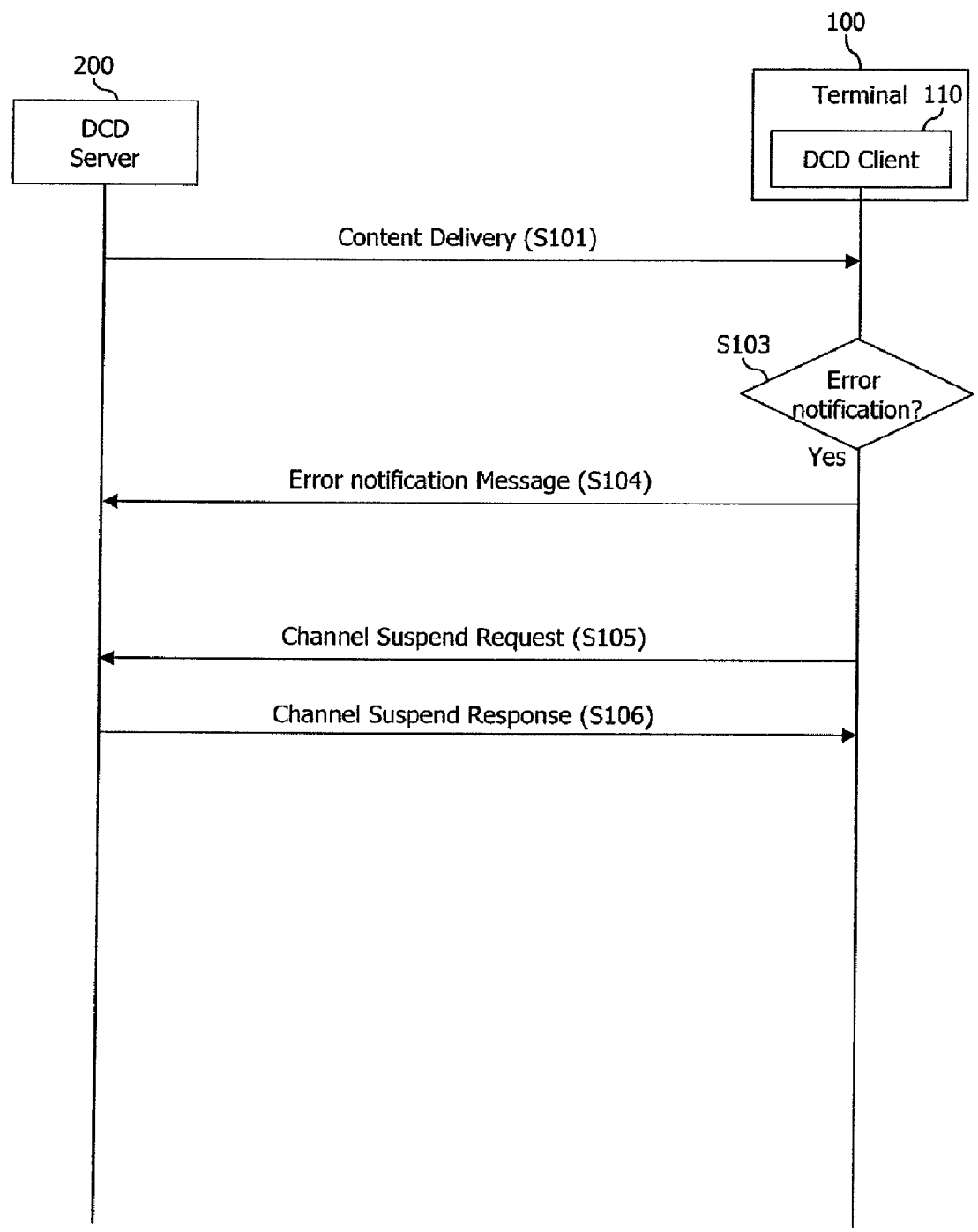
FIG. 1 is a flowchart showing a method according to a first embodiment of the present invention.
Figure 2:
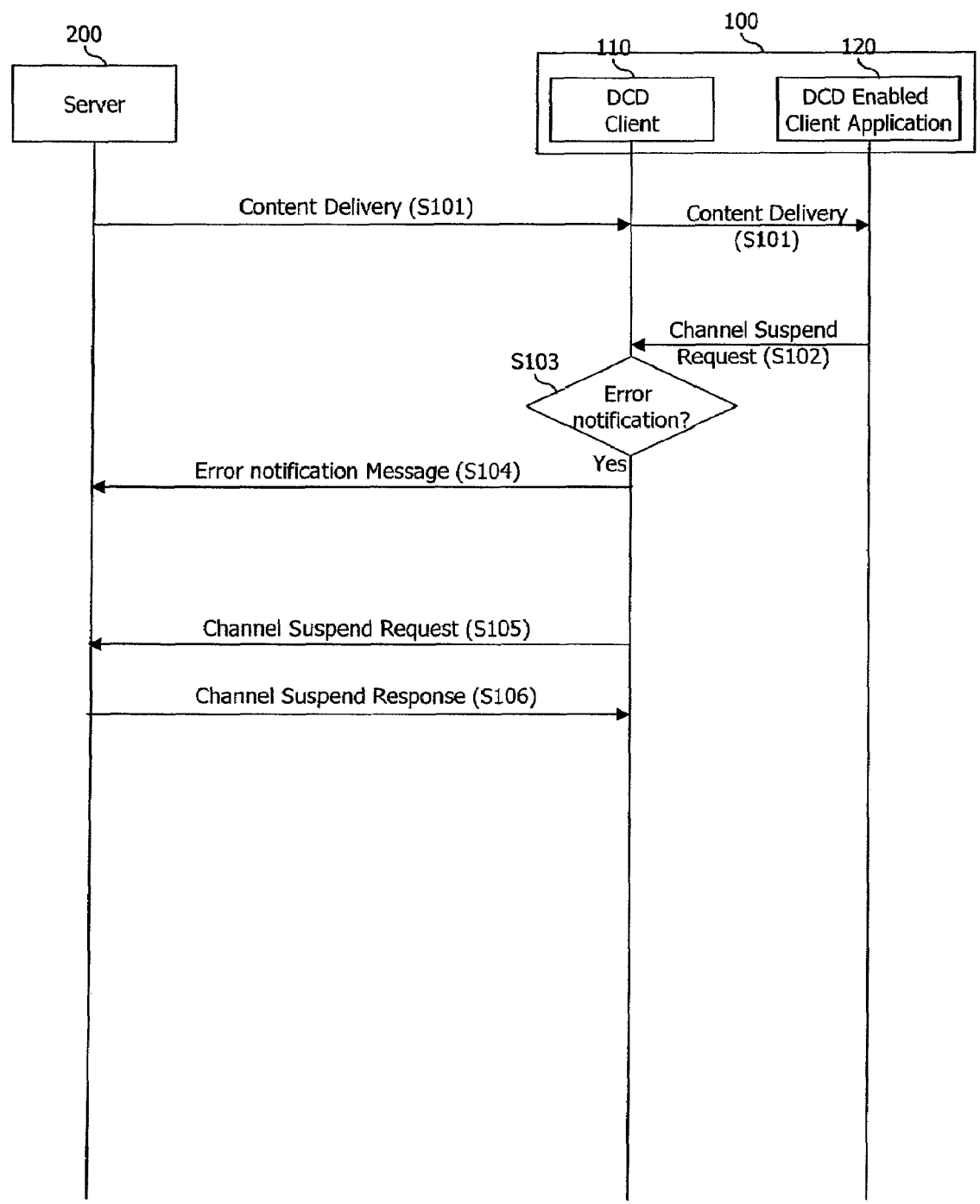
FIG. 2 is an exemplary view showing the first embodiment shown in FIG. 1.

FIG. 1 is a flowchart showing a method according to a first embodiment of the present invention, and FIG. 2 is an exemplary view showing the first embodiment shown in FIG. 1.

Referring to FIG. 1, a first embodiment of the present invention provides a procedure which can suspend content transmission/reception. In more detail, it is as follows:

1) A DCD server 200 transmits a content within a certain channel to a terminal 100 (S101).

2) While receiving the content within the certain channel, a DCD client 110 of the terminal determines when an error should be notified to the DCD server 200 (S103).

Here, "when the error should be notified" refers to a case in which the transaction is terminated before the content has been fully delivered, i.e., a case in which the content transmission is suspended.

That is, "when the error should be notified" refers to when a suspend request is received from an application in the terminal 100. For instance, as shown in FIG. 2, it is a case in which the DCD client 110 receives a suspend request message for a certain channel (e.g., Channel Suspend Request message) from a DCD enabled client application 120 in the terminal. Here, the Channel Suspend Request message may include an ID parameter for the certain channel. The channel suspend request message may be received from other application in addition to the DCD enabled client application 120. Accordingly, if the DCD client 110 receives the channel suspend request message from the DCD enabled client application 120 or other application, the DCD client 110 checks whether there is a downloading content from the DCD server 200. And, if there is some uncompleted content to download, it is determined to transmit the error message in the determination step S103.

Further, "when the error should be notified" refers to when a predetermined condition in the terminal 100 is satisfied, thus to need to suspend the reception of the content within the certain channel. For instance, it is a case in which a suspension condition within a channel metadata stored in the terminal 100 is satisfied. More specifically, if a condition to suspend the channel reception when the terminal 100 enters into a roaming state is set in the channel metadata, and then the condition is satisfied. It is helpful to reduce costs by suspending the reception of the content, since the roaming generally requires much costs.

3) If it is determined to notify an error based on the determination step S103, the DCD client 110 notifies an error to the DCD server 200. That is, as mentioned above, if the transaction is terminated before the content has been fully delivered, the DCD client 110 reports the error.

Here, as shown in the drawing, the error notification can be achieved by transmitting an error notification message. Here, the error notification message may include an error-code element and an errored-parameter element. A numeric code for an error occurred is written in the error-code element. In more detail, a numeric code indicating an error condition, "delivery interrupted," is written in the error-code element. The "delivery interrupted" signifies that the content delivery has been interrupted for many reasons, e.g., content suspension. Meanwhile, a name, an attribute and a value of a message found to be an error may be written in the errored-parameter element. A value of "bytes-received" may further be written in the errored-parameter element. The "bytes-received" indicates successfully received bytes.

4) Meanwhile, the error notification message may further include one or more of a message-type element, a session-ID element, a message ID element, an error-severity element, an error-description element, a content-provider-error element and an application-error element. The message-type element indicates a message type identifier of the error notification message. The session-ID element indicates a session identifier, and the message-ID element includes an identifier which is capable of identifying the error notification message. The error-severity element indicates an impact of an error condition on the handling of the indicated message, and the error-description element indicates an error name. The content-provider-error element indicates an error code received from a content provider (i.e., the DCD server (200)). The application-error element indicates an error code received from the DCD enabled client application 120.

Meanwhile, the DCD client 110 of the terminal 100 transmits a channel suspend request message to the DCD server 200 (S105). Here, the channel suspend request message may include a channel-ID element for specifying an ID for the certain channel. The channel-ID element may specify IDs for one or more channels, and each of the IDs may be separated by a comma (,). If empty, all non-emergency channels are affected by this transaction. The suspend request message may additionally include one or more of a message-type element, a session-ID element and a message-ID element.

5) Having received the suspend request message from the terminal 100, the DCD server 200 transmits a channel suspend response message to the terminal 100 (S106). The channel suspend response message may include a status element containing IDs and status values for the channels requested for a suspension. And, the channel suspend response message may additionally include a message-type element, a session-ID element and a message-ID element.

As so far described, the first embodiment of the present invention is to appropriately notify to the DCD server 200 when it is desired to suspend the reception of the content within the certain channel from the DCD server 200 or when the reception thereof is suspended due to an unexpected reason.

FIG. 3 is a flowchart showing a method according to a second embodiment of the present invention.

Referring to FIG. 3, a second embodiment of the present invention is to resume the certain channel and to continue to receive the suspended content after the reception of the content within the certain channel has been suspended as shown in FIGS. 1 and 2.

1-6) The processes in steps S201-S206 are the same as those in steps S101-S106 in FIGS. 1 and 2, and explanations therefor are omitted.

7) If it is desired to resume a reception of the suspended certain channel, the DCD client 110 of the terminal 100 transmits a channel resume request message to the DCD server 200 (S207). More specifically, if a user of the terminal 100 wants to resume the content reception, although not shown, the DCD enabled client application 120 sends a channel resume request message to the DCD client 110, then the DCD client 110 sends the channel resume request message to the DCD server 200. Here, the channel resume request message may include a channel-ID element for specifying an ID for the certain channel. The channel-ID element may specify IDs for one or more channels, and each of the IDs may be separated by a comma (,). If empty, all non-emergency channels are affected by this transaction. The channel resume request message may additionally include one or more of a message-type element, a session-ID element and a message-ID element.

8) Having received the channel resume request message from the terminal 100, the DCD server 200 transmits a channel resume response message to the terminal 100 (S208). The channel resume response message may include a status element containing IDs and status values for the channels. The channel resume response message may additionally include a message-type element, a session-ID element and a message-ID element.

9) Meanwhile, after the terminal 100 requests for resuming the channel, it may request to resume a reception for the content suspended. For this, the DCD client 110 of the terminal 100 transmits a content repair request message to the DCD server 200 (S209). Here, the content repair request message may include a failed-content ID element for specifying an ID for the suspended content and a byte-received element for indicating bytes which have been successfully received. Additionally, the content repair request message may include one or more of a message-type element, a session-ID element, a message-ID element, a failed-message-ID element and a channel-ID element.

10) Having received the content repair request message, the DCD server 200 transmits a content repair response message to the terminal 100 (S210). The content repair response message may include a content-package element indicating a content package requested for repair. Additionally, the content repair response message may include one or more of a session-ID element, a message-type element and an alternate-delivery element for specifying a name of an alternative bearer supported by the DCD client 110.

11) The DCD server 200 checks the suspended content ID and the bytes which had been successfully transmitted on the basis of the failed-content ID element and the byte-received element included in the content resume request message, and then transmits remaining bytes of the content to the terminal 100 (S211).

As so far described, in the related art, when the content delivery is interrupted, the DCD server 200 could not know in detail how much the DCD server 200 itself has successfully transmitted the content to all of the terminals. However, in the second embodiment of the present invention, the terminal 100 notifies to the DCD server 200 what the terminal 100 itself has successfully received, thereby facilitating resuming the content reception.

The method according to the preferred embodiments of the present invention may be implemented as software, hardware, or any combination thereof. For instance, the method according to the present invention may be stored in storage medium (e.g., internal memory in a mobile terminal, a flash memory, a hard disk, etc.), and also may be implemented as codes or commands within a software program which can be executed by a processor (e.g., internal microprocessor in a mobile terminal).

In FIGS. 1 through 3, the terminal 100 is shown to include the DCD client 110 and the DCD enabled client application 120, thus to describe the scope of the present invention limiting to the DCD (Dynamic Content Delivery) technology. However, it should be noted that it may be applied to all other technologies which can receive the content through a mobile communication network.

Also, the terminal 100 shown in FIGS. 1 through 3 indicates all devices which are capable of receiving the content through the mobile communication network, e.g., a user equipment (UE), a mobile phone, a cellular phone, a smart phone, a PDA (Personal Digital Assistant) phone, and the like.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the sprit and scope of the invention disclosed herein.

What is claimed is:

1. A method for resuming content transmission/reception, the method performed by a mobile communication terminal and comprising:

receiving, by the mobile communication terminal, a content through at least one channel between a Dynamic Content Delivery (DCD) client in the mobile communication terminal and a DCD server;

locally terminating, by the DCD client in the mobile communication terminal, a transaction for the reception of the content upon satisfaction of the content reception suspension condition when the mobile communication terminal is roaming outside of a home network;

transmitting, by the DCD client in the mobile communication terminal to the DCD server, an error notification message including a first element indicating that reception of the content via the at least one channel is suspended and a second element indicating a number of bytes received;

transmitting, by the DCD client, a channel resume request message to the DCD server in order to resume the at least one channel, wherein the channel resume request message includes a first element for specifying an ID for the at least one channel;

receiving by the DCD client, a channel resume response message from the DCD server; and receiving, by the DCD client, the suspended content from the DCD server.

2. The method of claim 1, wherein the channel resume request message is a ChannelResumeRequest message, and the channel resume response message is a ChannelResumeResponse message.

3. The method of claim 1, wherein the first element of the channel resume request message is a "channel-ID" element.

4. The method of claim 1, wherein the second element of the channel resume response message is a "status" element.

5. The method of claim 1, wherein the step of receiving the suspended content indicates receiving the content from a part which had been successfully received.

* * * * *